United States Patent
Schmidt et al.

(10) Patent No.: US 8,401,489 B2
(45) Date of Patent: Mar. 19, 2013

(54) CALIBRATING A TELEPHONE HANDS FREE SYSTEM

(75) Inventors: Gerhard Uwe Schmidt, Ulm (DE); Guido Kolano, Salach (DE)

(73) Assignee: Harman International Industries, Incorporated, Stamford, CT (US)

( * ) Notice: Subject to any disclaimer, the term of this patent is extended or adjusted under 35 U.S.C. 154(b) by 789 days.

(21) Appl. No.: 12/202,129

(22) Filed: Aug. 29, 2008

(65) Prior Publication Data
US 2009/0060166 A1 Mar. 5, 2009

(30) Foreign Application Priority Data
Aug. 31, 2007 (EP) .................... 07017112

(51) Int. Cl.
*H04B 17/00* (2006.01)
(52) U.S. Cl. ................... 455/67.14; 455/226.1
(58) Field of Classification Search ............ 455/75, 455/77, 87
See application file for complete search history.

(56) References Cited

U.S. PATENT DOCUMENTS

| | | | |
|---|---|---|---|
| 6,625,448 B1 | 9/2003 | Stern | |
| 6,832,075 B1 * | 12/2004 | Henry, Jr. | 455/67.14 |
| 2005/0176375 A1 * | 8/2005 | Bednasz et al. | 455/67.12 |
| 2006/0111154 A1 | 5/2006 | Tran | |
| 2006/0211427 A1 * | 9/2006 | Azman et al. | 455/450 |
| 2006/0239228 A1 * | 10/2006 | Matsuki | 370/331 |
| 2006/0291549 A1 * | 12/2006 | Seppinen et al. | 375/227 |
| 2007/0033030 A1 | 2/2007 | Gottesman | |
| 2008/0020807 A1 * | 1/2008 | Kolano et al. | 455/569.1 |

FOREIGN PATENT DOCUMENTS

| EP | 1 376 997 A1 | 1/2004 |
|---|---|---|
| EP | 1 883 213 A1 | 1/2008 |

OTHER PUBLICATIONS

Hayes, M. H., Chapter 4, "Statistical Digital Processing and Modeling", Wiley, Copyright 1996, pp. 129-177.
ITU-T Recommendation P.501: Test signals for use in telephonometry, International Telecommunication Union, Geneva, Switzerland, May 2000, 35 pages.
ITU-T Recommendation P.50: Artificial voices, International Telecommunication Union, Geneva, Switzerland, Sep. 1999, 22 pages.
Jax, P., Chapter 6, "Bandwidth Extension for Speech," *Audio Bandwidth Extension*, Ed. E. Larsen and R. M. Aarts, John Wiley & Sons, Ltd., 2004, pp. 171-235.
Kammeyer, K. D. et al, Chapter 8, "Traditionelle Spektralschätzung," *Digitale Signalverarbeitung*, Teubner-Verlag, 1998, pp. 312-339.

* cited by examiner

*Primary Examiner* — Creighton Smith
(74) *Attorney, Agent, or Firm* — Brinks Hofer Gilson & Lione

(57) ABSTRACT

A calibration device automatically calibrates a telephone hands free system. The device includes a signal processor that processes a received telephone signal that may be converted into audible sound through the hands free system. A first telephone and a second telephone communicate with the signal processor. The first telephone is programmed to transmit a predetermined test signal to the second telephone through a wireless or physical medium. A comparator compares the received test signal to a predetermined reference signal at a hands free interface. The comparison determines a deviation from the reference signal. An adaptor modifies the processing of the digitized aural information based on the deviation.

18 Claims, 8 Drawing Sheets

CALIBRATING A TELEPHONE HANDS FREE SYSTEM

PRIORITY CLAIM

This application claims the benefit of priority from European Patent 07017112.9 dated Aug. 31, 2007, which is incorporated by reference.

BACKGROUND OF THE INVENTION

1. Technical Field

The disclosure is directed to calibrating a wireless hands free system.

2. Related Art

Hands free systems may connect wireless users to a mobile telephone. The connection may use a wireless or physical technology to interface users to the phone. In vehicles, a cradle or a connector may interface the phone to an audio system. In use, signals received by the phone are passed through the hands free system before they are converted into audible sound. Speech from a near speaker (e.g., the driver) may be received from an input within the vehicle cabin. The input signal is passed from the hands free system to the phone which transmits the signals to a distant receiver.

Some phones compensate for signal distortions caused by the internal input or output devices. Some systems apply a fixed compensation to compensate for these distortions. In these applications, the systems may apply fixed compensation parameters. For different phones, suitable compensation parameters are predetermined.

A global compensation strategy may be adopted for a given model of phone. Unfortunately, variation may be common to identical models (e.g. due to production tolerances). In systems, software changes such as firmware updates may affect compensation quality just as unexpected noise or disturbances may affect quality.

SUMMARY

A calibration device automatically calibrates a telephone hands free system. The device includes a signal processor that processes a received telephone signal that may be converted into audible sound through the hands free system. A first telephone and a second telephone communicate with the signal processor. The first telephone is programmed to transmit a predetermined test signal to the second telephone through a wireless medium. A comparator compares the received test signal to a predetermined reference signal at a hands free interface. The comparison determines a deviation of the received test signal from the reference signal. An adaptor modifies the processing of the digitized aural information based on the deviation.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
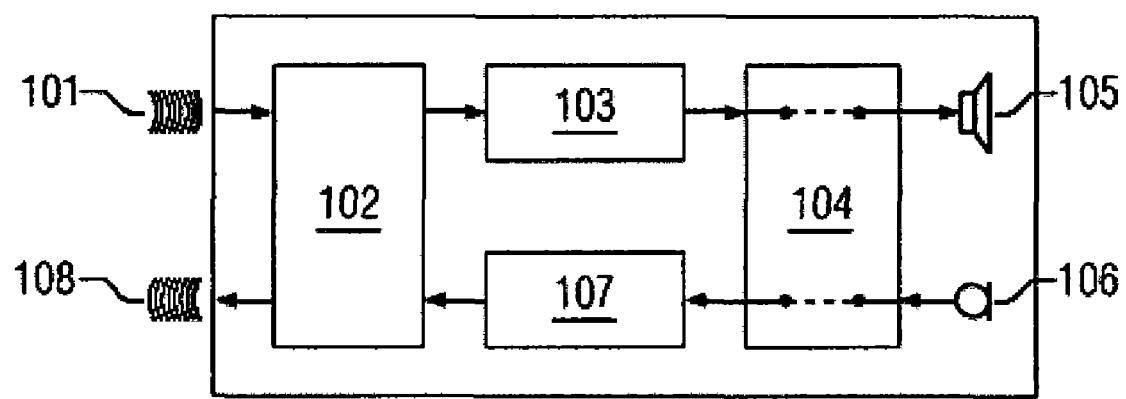
FIG. 1 is an exemplary hands free system.

FIG. 1 is a hands free system that may receive and transmit signals. The system may interface one or more device(s) 102 (e.g., a mobile or wireless phone) that convert voice and other signals 101 (e.g., sounds) into a form that may be transmitted to remote locations and receive and convert continuously varying (e.g., in strength and/or quality) or digital signals into sound or aural signals. In FIG. 1, converted signals are received by the device 102. A signal processor 103 modifies or processes the input before it is transmitted to a controller 104. The controller 104 may receive and/or transmit audio through an input/output driver. An input device 106 receives sound and converts it into an analog or digital operating signal that may be processed by the input/output driver. The input device 106 may comprise one or more microphones or microphone arrays. The output device 105 may comprise one more loudspeakers. In FIG. 1, the output device 105 may convert operating signals into audible sound.

Acoustic signals received through the input device 106 are processed by a signal processor 107. The signal processor 107 may modify the input so that it adapted to a programmable characteristic or is equalized. The adaptation and/or equalization (e.g., compensate for frequency and/or other distortion) may occur with respect to device 102 (e.g., mobile or wireless phone) through which voice and other sounds may be converted into a form 108 that may be transmitted to one or more remote locations.

In some devices 102 (e.g., mobile or wireless phones), hardware and/or software may selectively pass certain elements of a signal and/or substantially eliminate or minimize others. An exemplary digital compensation filter or programmable filter may compensate for noise and other interference including attenuations that may occur at low frequencies. In some applications that use of correction filters (such as in mobile phones), the correction filter may be deactivated or removed to minimize the filtering effects that may be heard at low frequencies. In other applications, the signal processor 103 may compensate for this effect by modifying the output (or input) signals.

A signal processor 107 may compensate for differences in the frequency response of an input of the input device 102 (e.g., a microphone of a mobile phone) and the input 106 (e.g., microphone) of the hands free system. The processing performed by the signal processors 103 and 107 may be linear or non-linear. The static or dynamic compensation parameters may be stored in a local, distributed, vehicle, hands free, and/or wireless device memory.

Figure 2:
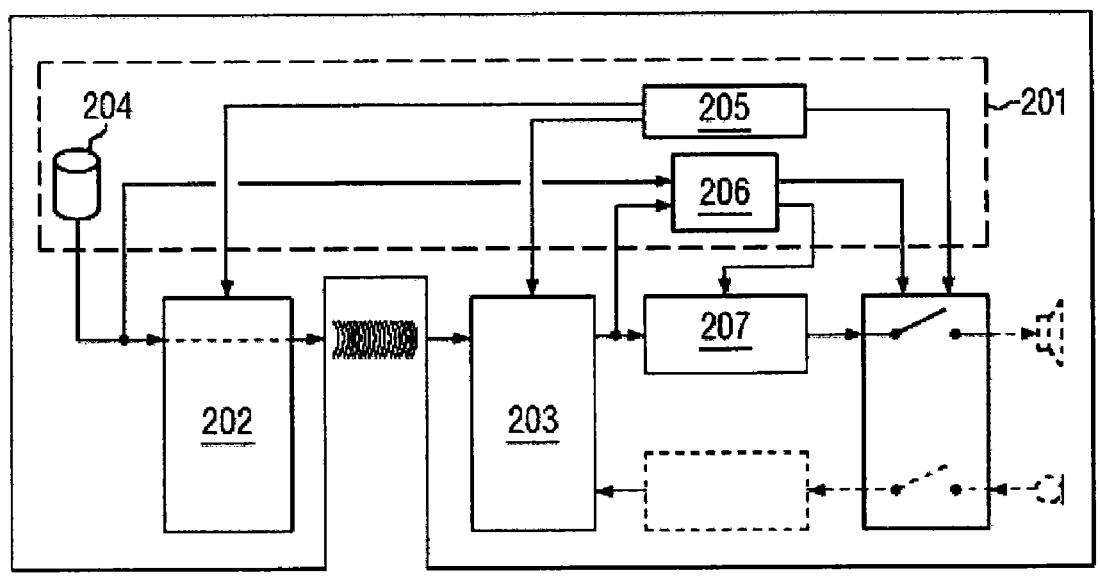
FIG. 2 is a hands free system that interfaces a calibration device.

FIG. 2 is a hands free system that interfaces a calibration device 201. A first and second device 202 and 203 (e.g., mobile or wireless phones) communicate with the calibration device 201. The first and second devices 202 and 203 may convert voice and other signals 101 (e.g., sounds) into a form that may be transmitted to remote locations and receive and convert continuously varying (e.g., in strength and/or quality) or digital signals into sound or aural signals. The calibration device 201 may be a unitary part of a hands free system so that the devices 202 and 203 may be connected or in communication with the hands free system. In some systems, in-vehicle or network communication occurs through a physical connection (e.g., through a plug connecter of a cradle) wireless protocol or network. Transceivers within the devices 202 and/or 203 may provide short and/or long range radio, optical, or operational links that may not require a physical communication path to receive or transmit voice and/or data. The communication protocol or network may provide an interoperable communication link with other in-vehicle or external applications and/or devices. In some systems, a wireless network may provide connectivity when the wireless network or a wireless service provider indicates a channel capacity or excess channel capacity to transfer some or all of the desired data to a destination. A device 202 and/or 203 (or 102) push may load the desired data to a destination and may keep the connection open to allow the device 202 and/or 203 (or 102) to continue sending information, data, or respond to external requests (e.g., queries). The devices 202 and/or 203 (or 102) may pull data too, in which a connection may or may not remain open.

In some systems, the transceivers may be compliant with a low-cost, low-power, wireless mesh network, such as Zigbee (e.g., 868 MHz in Europe, 915 MHz in countries such as USA and Australia, and 2.4 GHz in other jurisdictions), or a short range protocol, such as Bluetooth R™. The Bluetooth word mark and logos may be owned by Bluetooth SIG, Inc. Bluetooth may encompass the wireless specification defined by IEEE 802.15, 802.15.4 (TG4), 802.15.3 (TG3), or other standards. The standard may include multiple sub-layers including an RF layer that may be based on an antenna power range starting at about 0 dBm up to a range of about 20 dBm in the abut 2.4 GHz band and having a link range from about 10 centimeters to about 10 meters. It may include a baseband layer that establishes a physical link between devices forming a piconet (e.g., a network of devices that may be connected in an ad hoc fashion). It may include a link manager that sets up the link between Bluetooth devices. Other functions of the link manager may include security, negotiation of baseband packet sizes, power mode and duty cycle control of the communication portion of the device, and the connection states of a compliant device in a piconet. Also, it may include a logical link control and adaptation protocol (L2CAP) that provides the upper layer protocols with connectionless and connection-oriented services.

In FIG. 2, the calibration of the hands free system is performed with respect to the second device 203 which may be a wireless or mobile phone. The first device 202 (e.g., telephone) may be a unitary part of the hands free system and/or the calibration device 201. In some systems, the first device 202 comprises an in-vehicle or a local NAD (network access device). In NAD devices, the internal signal transmission and/or processing parameters may be pre-programmed. In some systems the first and/or second device 202 and/or 203 (e.g., telephone) are compliant with a GSM protocol or includes a GSM element (Global System for Mobile communication), in other systems the first and second devices 202 and 203 may be compliant with multiple or different protocols (e.g., a Universal Mobile Telephone Service or UMTS protocol or element may be used). In another alternative, the first device 202 may comprise a phone having predetermined or known internal signal transmission and/or processing parameters. In these examples, the first device 202 may be used as a reference telephone.

Calibration may occur automatically or in real-time each time the second device 203 (e.g., telephone) initiates a call or communicates with the hands free system. In other applications the calibration may occur at a user's discretion. In an exemplary application a user may be informed through a visual, audio or tactile prompt through a device driver. The prompt may indicate that the second device 203 is waiting for an input from the user to perform a calibration or schedule or initiate an auto calibration mode.

The calibration device 201 may access a local or distributed memory 204 that may retain a test signal. The calibration device 201 may comprise a controller 205 that executes an activation driver that may cause the first device 202 to transmit the predetermined test signal to the second device 203 through a wireless or physical connection. In some applications, the test signal may comprise a broadband time-varying signal. The test signal may be compliant with a GSM or CDMA (Code Division Multiple Access) or other wireless or cellular protocol.

Figure 3:
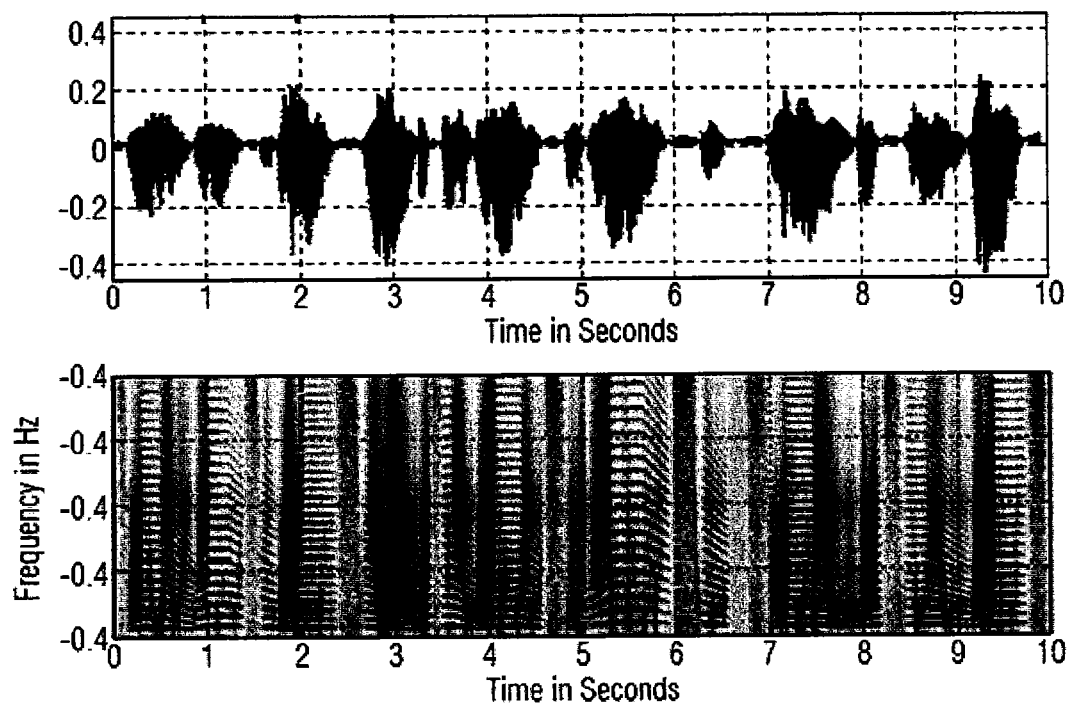
FIG. 3 is an exemplary test signal.

In alternative systems, a test signal may comprise a white noise or pseudo noise. A pseudo noise sequences may generated using feedback shift registers that may be accessed by a processor. These signals may be used in systems having limited memory. Time variation of such a signal may be generated through a subsequent, time-varying attenuator. When a white noise or pseudo noise is used, the systems may interface receiving systems or coding schemes that do not interpret such signals as background noise and thereafter attenuate it. In other systems, non-stationary signals such as a composite source signal (e.g., ITU-T recommendation P.501: Test Signals for use in Telephonometry, Geneva, Switzerland, 2000) or an artificial voice signal (e.g., ITU-T recommendation P.50: Artificial Voice, Geneva, Switzerland, 1999) may comprise the test signal. FIG. 3 shows another alternative test signal. In the upper frame of FIG. 3, the variation is shown in time. The lower frame shows a time/frequency analysis.

During calibration a communication signal may be received from the second device 203 (e.g., telephone). The signal may be compared to a reference signal by an analyzer 206 (or comparator). In some applications the test signal and the reference signal may be substantially identical. When analyzed, a received test signal and a reference signal may be adapted to compensate for time delay. A compensator within the analyzer may execute a correlation analysis before the signals are compared. Differences between the test and reference signals may render one, two, or more equalizing parameters that may be processed by the signal processor 207.

To attain a compensation and/or equalization in a reception signal path or channel through the signal processor 207, a level correction may be derived. The received signal level (input level) may be compared (possibly after some averaging over time by an averaging device) against a static or dynamic target level. The difference may be minimized or adjusted by a level equalization that is attained by establishing or adjusting a level control parameter.

Following a level correction, an equalization of the reception frequency response may occur. An equalization may determine a power density spectrum of the received signal (e.g., telephone signal). Such a power density spectrum may be obtained by a temporal averaging of the short-time Discrete Fourier Transform (DFT) spectra (an exemplary periodogram averaging may be described by, K. D. Kammeyer et al, "Digitale Signalverarbeitung" Teubner-Verlag, 1998) or through a Linear Predictive Coding (LPC) analysis (an exemplary LPC may be described by M. H. Hayes, "Statistical Digital Processing and Modelling", Wiley 1996). In the latter case, the equalization may be performed through a parametric method using Finite Impulse Response (FIR) filter(s) or Infinite Impulse Response (IIR) filter(s) of no order. In both alternatives, the maximal attenuation and the maximal amplification may be limited. For example, if a strong attenuation of the second device 203 at low frequencies is to be compensated, without limiting the applied attenuation, the internal noise of some systems may increase and adversely affect audio quality.

Additionally, the calibration device 201 may detect or determine whether the second device 203 uses an automatic amplification control (e.g., static or dynamic amplifier) in the reception path. For this purpose, suitable test signals with levels varying by some dB may be used in some systems. If a level variation is compensated for after a tuning phase, this may be an indication of an automatic amplification control in the second device 203. In some systems, a corresponding automatic amplification control or amplifier in the hands free system may be deactivated.

Some calibration devices may detect whether a limiter is activated within the second device 203. At this stage, a test signal having large amplitudes that may near an overload level may be processed. By comparing the signal-to-noise ratio of the received test signal and the reference signal, the system may detect a limiter and determine if corresponding maximal attenuation is set. Depending on the comparison, a limiter interfaced to or integrated with (e.g., unitary) the signal processor 207 may be modified or adapted. If a maximal attenuation of about 12 dB is desired and an attenuation by about 8 dB is detected in the second device 203, for example, a limiter (will be detected and) may be adapted to a maximal attenuation of about 4 dB.

Noise suppression may also be detected. If a test signal with a predetermined noise level is used, the signal processor 207 may detect noise suppression when processing the output of the second device. When detected, the signal processor 208 may adapt the applied compensation.

A frequency response and a reception signal transmission path may be monitored and/or processed when extending the bandwidth of band limited communication signals (e.g., a telephone bandwidth) received by the second device 203 (e.g., telephone). When performing an extension, an extension signal for frequency ranges below a lower threshold (such as the lower telephone band frequency, e.g. about 200 Hz) and/or above an upper threshold (such as the upper telephone band frequency, e.g. about 3400 Hz) may be generated and added to a received telephone signal e.g., P. Jax; "Bandwidth Extension for Speech", in E. Larsen et al., Audio Bandwidth Extension, Wiley, 2004, pages 171-235). Some systems evaluate the frequency response of the second device 203 to improve an estimation of the missing spectral components. When the frequency response of the second device is known the bandwidth extension better match any input data.

Figure 4:
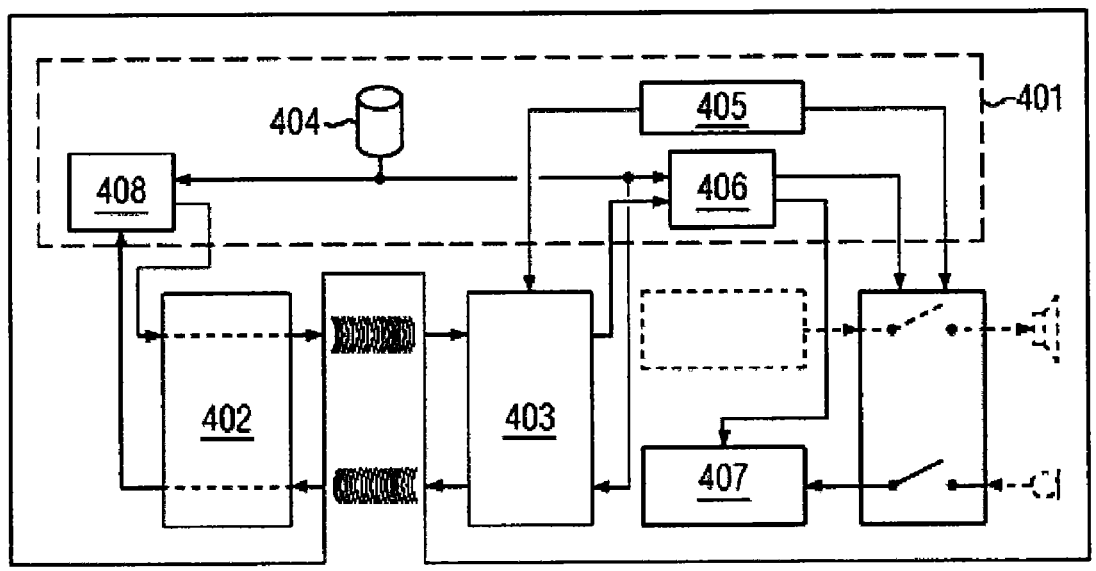
FIG. 4 is an alternative hands free system that interfaces a calibration device.

Alternatively, or additionally to the compensation or equalization that may occur in the reception signal path, a compensation or equalization in the transmission signal path may also occur as shown in FIG. 4. In this alternative, a first device 402 (e.g., telephone) and a second device 403 (e.g., telephone) are in communication with a calibration device 401 of a hands free system. The calibration device 401 may prompt or direct the second device 403 to send or transmit a test signal to the first device 402 across a telephone bandwidth.

When received, the test signal received by the first device 402 is compared to a reference signal by an analyzer 408 (or a comparator). The test signal and the reference signal may be identical and be stored in a local database, or a local or remote distributed memory 404. From this comparison, the signal processor 407 may be adapted through an analyzer 406. A controller 405 may cause the second telephone to transmit the test signal.

The compensation or equalization may be performed by signal processor 407. A level correction or equalization and/or a frequency response equalization may be performed. When as automated amplifier, limiter, or noise suppressor is detected, the signal processor 407 may adjust its compensation or equalization.

The above described systems may not only calibrate peer-to-peer telephone communications that may be facilitated by a hands free system, but alternatives may also calibrate or compensate mobile phone networks or network connection (e.g., device to network connections). In these systems, some or all of the hardware and software described above may compensate for mobile phone network limitations through a series of signal exchanges. Through such analysis the resulting parameters executed by a signal processor that may process signals in a reception signal path and/or the transmission signal path may be stored with or may be associated with an identifier of one or more mobile or wireless phone networks. In operation, the signal processor may process the signal processing parameters that compensate for characteristics in a selected phone network and/or within the first device (e.g., transceiver or 102, 202, 402). Different signal processing parameters may be executed for different networks such as UMTS networks, GSM networks, etc.

Figure 5:
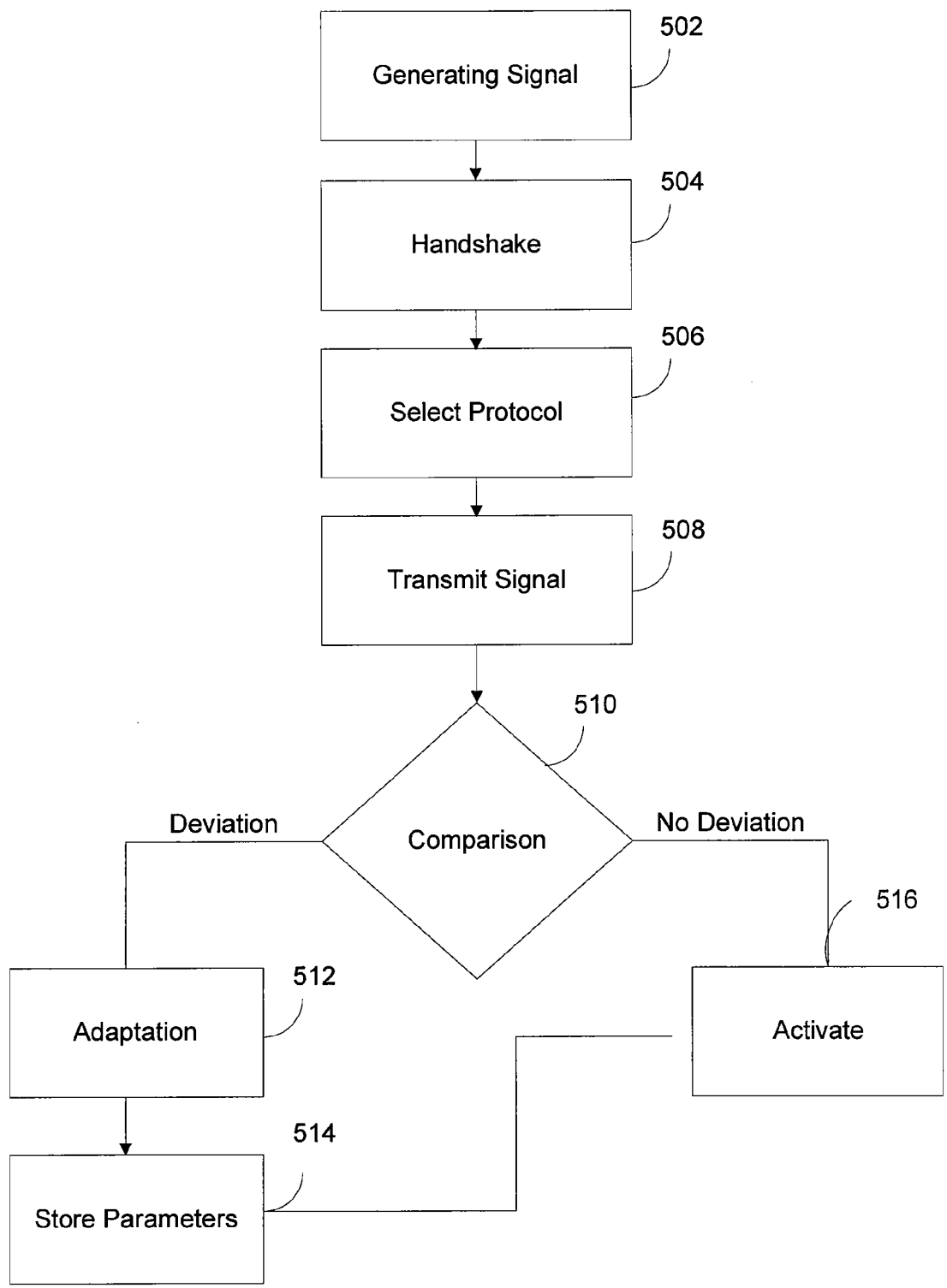
FIG. 5 is calibration process.

Alternatively, a process may automatically calibrate a telephone hands free system. The system may include a signal processor that processes a received telephone signal that may be transmitted by a hands free system. A calibration device may communicate with a first and a second telephone (or communication device). The process may generate (FIG. 5) a test signal at 502 that is transmitted to a second telephone across a telephone bandwidth. Before the test signal is transmitted a series of signals acknowledging that communication or a transfer of information may take place may be exchanged at 504. After each device indicates it readiness to send or receive data, the test signal is transmitted at 508. A comparison of the received test signal with a predetermined reference signal may determine a deviation at 510. If a deviation is detected a signal processing method may determine compensating or equalizing values at 512 that may be stored in a local or a remote central or distributed memory at 514. At 516 the hands free process may indicate its readiness to send or receive other voice and data.

When the process is executed automatically, some processes do not retain the compensating or equalizing parameters when re-activated (although it may be done in alternative processes). Some processes may adapt the hands free system to mobile phones, without previously identifying the telephone. Through these methods, a hands free system may automatically calibrate when an incoming telephone signal is received.

In some processes, a first and second telephone communicates directly to a calibration device through a physical or wireless medium. When a wireless medium is used the connection may occur through various electromagnetic spectrums including a radio and/or an infrared spectrum (e.g. a wireless personal area network (WPAN) connection) such as Bluetooth, Wi-Fi or IrDA. When a physical connection occurs it may be made through a connector.

Some telephone hands free processes receive telephone signals through an input that is linked to a first and/or a second telephone. The method may transmit or output signals (possibly after some signal processing) through an output such as a loudspeaker or a headset. A signal processing method may process signals exchanged or transferred between an input for receiving a telephone signal from a telephone and an output for outputting an output audio signal (e.g. a loudspeaker or a headset). In these methods a test signal and/or the reference signal may comprise a time varying or analog audio signal or may comprise a digital signal.

In some alternative methods a signal processing method may be part of the hands free process and/or of the calibration process. When part of a system, the hands free system and/or the calibration device may comprise the signal processor. In other systems, the hands free system may comprise a calibration device.

In the systems or methods, the first and/or the second telephone or device may be a mobile or wireless phone. The first and/or the second telephones or devices may be a unitary part of or interface a hands free system. When part of a hands free system, telephones may include or may be compliant with a GSM module or a UMTS module. One or more of telephone may comprise a network access device (NAD). In these systems the internal signal processing and/or transmission parameters may be known (predetermined) and may be used as reference parameters in the calibrating method.

The test signal and/or the reference signal may be stored locally or remotely in the calibration device and/or in the hands free system. When stored locally, test signals and/or reference signals may be accessed quickly. In other processes, the test signal and/or the reference signal may be stored in the first or second telephone, respectively. The test signal may be a time-varying signal, such as a non-stationary signal. In some methods uncommon test signals may be used such as white noise. In some instances, coding schemes may be executed so that mobile phones do not suppress such signals as unwanted disturbances. Alternative forms of the test signal may comprise a composite source signal, an artificial voice signal, or a pseudo noise sequence. In the latter case, a time-varying attenuator may be used to obtain a time-varying signal. The test and reference signals need not be mutually exclusive. In some methods (and systems) the test signal and the reference signal may be nearly identical to reduce the complexity of the process (or system).

The process of adapting 512 may reduce deviation until it reaches a minimal threshold or a predetermined criterion. The processes are not limited by distance as any distance may be chosen to measure and determine the signal deviation. In some comparison processes 510 a correlation analysis of the received test signal and the reference signal may occur. Through this analysis delay between the received test signal and reference signal may be compensated. By this process, the hand free method may further compensate for the time delay between the received test signal and the reference signal.

In some hands free processes and/or the calibration process a signal processing method may modify an audio signal to compensate for signal processing and/or signal modifications variations within a second mobile phone. The variations may appear as a distortion of a received telephone signal. The signal processing method may equalize and adapt the audio signal. By processing digitized audio data (or information), the frequency response of the hands free system may be optimized or improved. The equalizing process may be dynamically or statically adapted automatically to reduce deviation to a predetermined criterion. Some dynamically adjusting equalizing methods may continuously adapt calibration parameters.

In some methods, adapting 512 may comprise adapting a level control parameter of the signal processor to achieve a level correction. The level control parameter of the signal processor may allow the method to control (e.g. increasing or decreasing) the level of a received telephone signal, such as the received test signal. The comparison 510 may compare the power of the received test signal with a predetermined target level. The adaptation of the level control parameter may be based on the power comparison.

Figure 7:
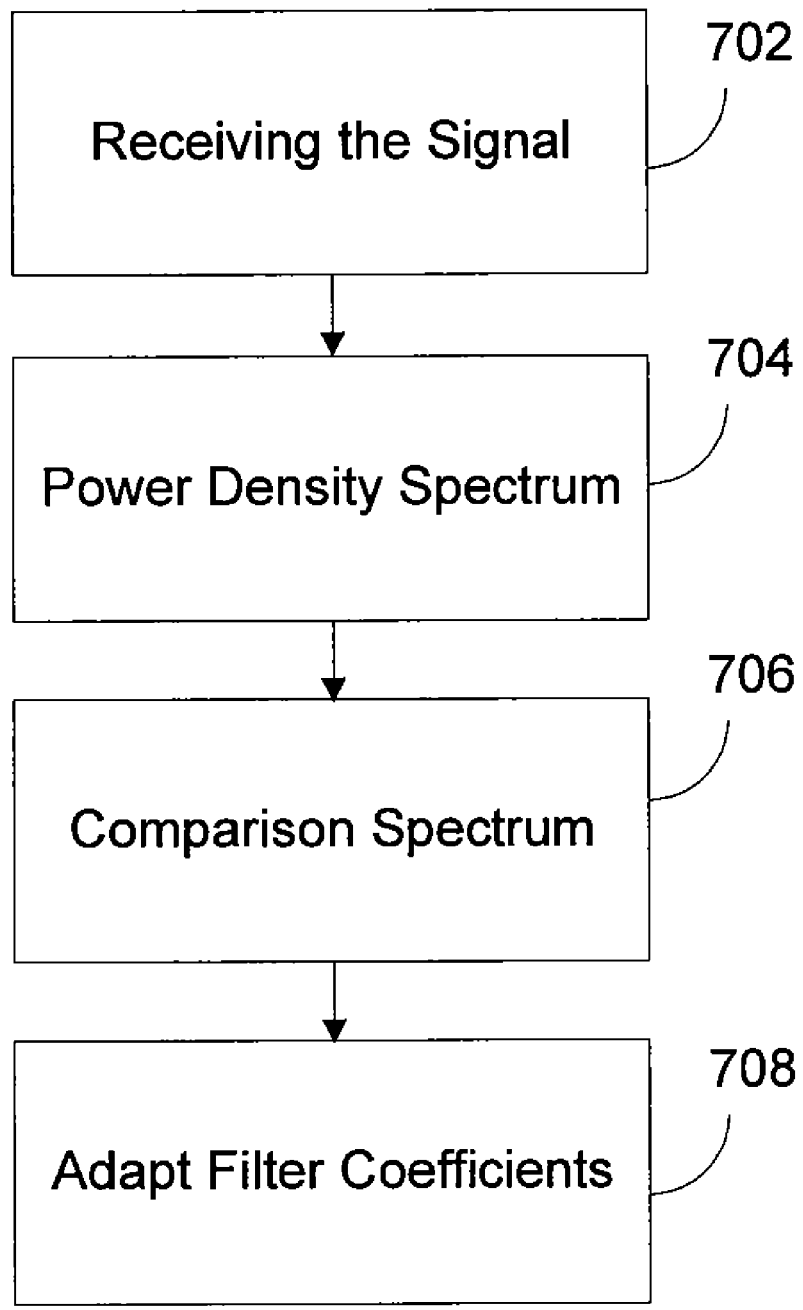
FIG. 7 is a second alternative calibration process.

After a test signal is received at 702 in FIG. 7, an adaptation may comprise adapting a frequency response of a signal processing method. After the power density spectrum of the received or derived at 704, it may be compared to a power density spectrum of a desired signal. The adaptation of the frequency response may be based on the determined power density spectrum or the comparison. The process of determining power density spectrum may comprise determining a short time spectrum or performing an LPC analysis. The adaptation of frequency response may be performed using a parametric method, e.g., using FIR or IIR filters at 708. In some methods the filter may be of a low order. In some alternative adaptation methods, a maximum attenuation and/or the maximum amplification may be limited.

In some methods, the process of adapting a frequency response of the signal processing method may occur after adapting a level control parameter of the signal processing method. In this and each of the other methods (and systems) the adaptation process may comprise adapting an automatic amplification control of the signal processing method. The comparison process may determine whether a second telephone provides an automatic amplification control. If an automatic amplification control is detected, an automated amplification control of the signal processing method may be switched off or deactivated. In these methods, a test signal showing a varying signal level may be used.

In each of the systems and methods described, the adaptation may comprise adapting a limiter or a noise suppressor that may communicate with signal processing method. The comparison may determine whether a second telephone employs a limiting process or a noise suppression method. An adaptation may be based on the comparison. When a limiter or a noise suppressor is detected, the limiter or a noise suppressor may be deactivated or, alternatively, reflected in the adaptation parameters. In both circumstance, the detection (or its potential) may affect the selection of a test signal. When a limiter is suspected, a test signal may have an amplitude corresponding to the overload level of a second telephone. When a noise suppressor is suspected, a test signal having a predetermined noise level may be selected. If two or more conditions are suspected, a combination of test signals may be used.

Each of the methods and systems described may perform a bandwidth extension. The bandwidth extension may generate an extension signal at frequencies above an upper threshold frequency and/or below a lower threshold frequency.

Figure 6:
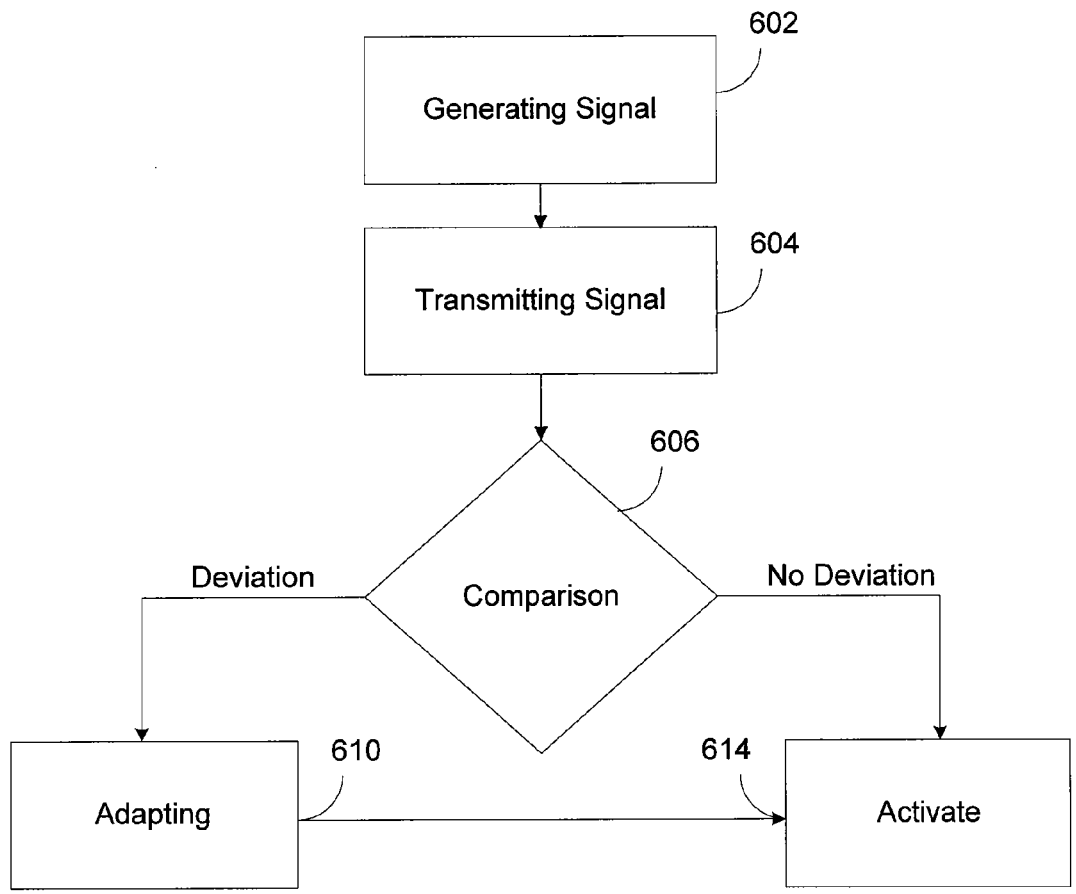
FIG. 6 is an alternative calibration process.

FIG. 6 illustrates an alternative method that calibrates a telephone hands free system through a calibration method. The calibration method supports a first and a second telephone interface that links telephone signals or may calibrate one or more telephones to a telephone network. A signal processing method processes an audio signal input through a hands free interface. At 602 a test signal is generated when a telephone transmits (at 604) a predetermined test signal to a first telephone through a telephone connection. At 604, the process compares the received test signal with a predetermined reference signal to determine a deviation. If a deviation (equals or) exceeds a programmed threshold, the calibration process generates a compensation at 610 that may be stored in a local or distributed memory. If the deviation is below a programmed threshold, the process activates normal communication at 614.

Figure 8:
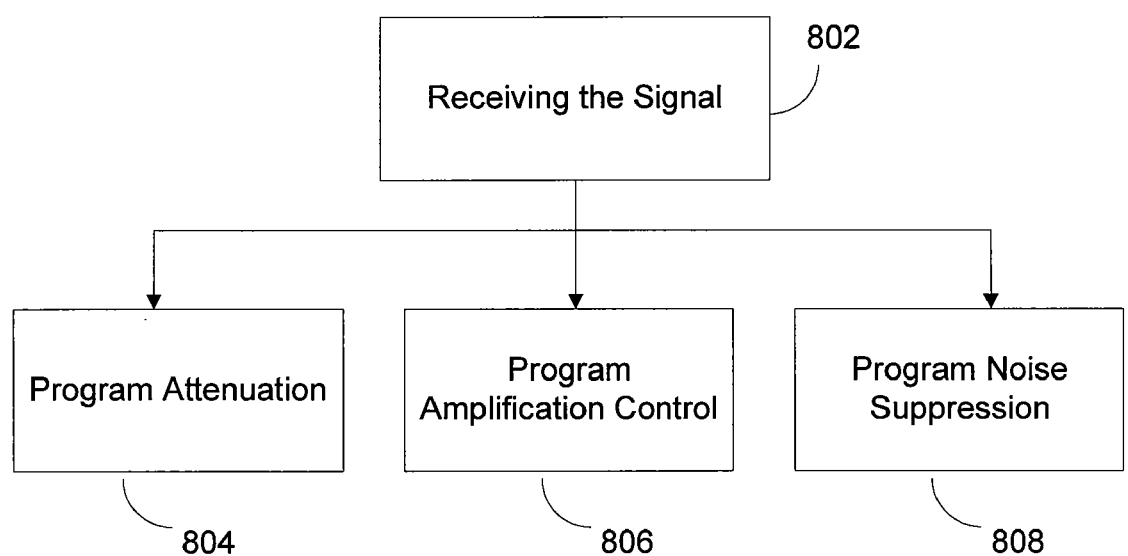
FIG. 8 are optional acts that may be included in the calibration processes of FIGS. 5, 6, and/or 7 that detects attenuation, amplification, and/or noise suppression.

The method of FIG. 6 is not limited to calibrating incoming signals exclusively. The calibration process may compensate outgoing signals or a combination of incoming and outgoing signals. In some methods shown in FIG. 6, the test and/or the reference signals may be identical or substantially identical. Moreover each of the methods may modify the test signal or modify the calibrated device (as shown in FIG. 8) by executing one or more programs that monitor attenuation at 804, amplification at 806, or noise suppression 808 when a signal is received at 802 or transmitted (not shown).

Other alternate systems and methods may include combinations of some or all of the structure and functions described above or shown in one or more or each of the figures. These systems or methods are formed from any combination of structure and function described or illustrated within the figures. Some alternative systems or devices compliant with one or more of the wireless protocols may communicate with one or more in-vehicle transceivers. In-vehicle and out-of-vehicle wireless connectivity between the hands free system, the vehicle, and one or more wireless networks provide high speed connections that allow users to initiate or complete a transaction at any time within a stationary or moving vehicle. The wireless connections may provide access to, or transmit, static or dynamic content (live audio or video streams, for example).

The methods and descriptions of FIGS. 5-8 may be encoded in a signal bearing medium, a computer readable medium or a computer readable storage medium such as a memory that may comprise unitary or separate logic, programmed within a device such as one or more integrated circuits, or processed by a controller or a computer. If the methods are performed by software, the software or logic may reside in a memory resident to or interfaced to one or more processors or controllers, a wireless communication interface, a wireless system, a powertrain controller, an entertainment and/or comfort controller of a vehicle or non-volatile or volatile memory remote from or resident to a hands free system. The memory may retain an ordered listing of executable instructions for implementing logical functions. A logical function may be implemented through digital circuitry, through source code, through analog circuitry, or through an analog source such as through an analog electrical, or audio signals. The software may be embodied in any computer-readable medium or signal-bearing medium, for use by, or in connection with an instruction executable system or apparatus resident to a vehicle or a hands-free or wireless communication system. Alternatively, the software may be embodied in media players (including portable media players) and/or recorders. Such a system may include a computer-based system, a processor-containing system that includes an input and output interface that may communicate with an automotive or wireless communication bus through any hardwired or wireless automotive communication protocol, combinations, or other hardwired or wireless communication protocols to a local or remote destination, server, or cluster.

A computer-readable medium, machine-readable medium, propagated-signal medium, and/or signal-bearing medium may comprise any medium that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical or tangible connection having one or more links, a portable magnetic or optical disk, a volatile memory such as a Random Access Memory "RAM" (electronic), a Read-Only Memory "ROM," an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled by a controller, and/or interpreted or otherwise processed. The processed medium may then be stored in a local or remote computer and/or a machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method that automatically calibrates a telephone hands free system through a calibration system, where a signal processor modifies a telephone signal to be transmitted from the hands free system, comprising:
   causing a first telephone to transmit a test signal to a second telephone across a telephone bandwidth;
   comparing the test signal to a predetermined reference signal to determine a deviation, the received test signal being transmitted from the second telephone and being passed through a hands free system; and
   adapting a signal processor based on the deviation;
   where the act of adapting comprises at least one of:
      adapting an automatic amplification controller that interfaces the signal processor or,
      adapting a limiter or a noise suppressor that communicates with the signal processor.

2. The method according to claim 1, where the first telephone is a unitary part of the hands free system.

3. The method according to claim 1, where the test signal or the reference signal is stored in a local memory of a calibration device or a hands free system.

4. The method according to claim 1, where the test signal comprises a time-varying signal.

5. The method according to claim 1, where the test signal comprises a non-stationary signal.

6. The method according to claim 1, where the test signal comprises a composite source signal, an artificial voice signal, or a pseudo noise sequence.

7. The method of claim 1, where the test signal and the reference signal are substantially identical.

8. The method according claim 1, where the act of comparing comprises performing a correlation analysis based on the received test signal and the reference signal.

9. The method according to claim 1, where the signal processor comprises a plurality of filters that automatically attenuate or amplify a plurality of frequency bands in real time and the act of adapting comprises adapting the plurality of filters in real time.

10. The method according to claim 1, where the act of adapting comprises adapting a level control parameter of the signal processor.

11. The method according to claim 1, where the act of adapting comprises adapting a frequency response of the signal processor.

12. The method according to claim 1, further comprising extending a bandwidth of a received telephone signal.

13. The method according to claim 1, where the first and the second telephone communicate through a wireless medium.

14. A method that automatically calibrates a telephone hands free system through a calibration system, comprising:
transmitting a wireless test signal from a first telephone;
comparing a power level of a received test signal to a power level of a predetermined reference signal at an in-vehicle hands free system to determine a deviation of the received test signal from the reference signal, the received test signal being received by a second telephone; and
adapting a hands free signal processor based on a measured deviation in the vehicle,
where adapting a hands free signal processor comprises at least one of:
adapting an automatic amplification controller that interfaces the hands free signal processor or,
adapting a limiter or a noise suppressor that communicates with the hands free signal processor,
where the deviation comprises a deviation of a power level of the test signal from a power level of the reference signal; and
where the test signal and the reference signal are substantially identical.

15. A computer readable storage medium comprising:
a first computer readable storage media having computer-executable instructions for:
transmitting a wireless test signal from a first telephone;
comparing a received test signal to a predetermined reference signal at an in-vehicle hands free system to determine a deviation of the received test signal from the reference signal, the received test signal being received by a second telephone; and
adapting a hand free signal processor based on a measured deviation in the vehicle,
where the act of adapting comprises at least one of:
adapting an automatic amplification controller that interfaces the signal processor or,
adapting a limiter or a noise suppressor that communicates with the signal processor.

16. A calibration device that automatically calibrates a telephone hands free system, comprising:
a signal processor that processes a received telephone signal converted into audible sound through a hands free system;
a first telephone and a second telephone in communication with the signal processor; where the first telephone is programmed to transmit a test signal to the second telephone through a wireless connection;
a comparator that compares the test signal to a predetermined reference signal at a hands free interface to determine a deviation of the test signal from the reference signal, the test signal having been received by the second telephone and being to be passed to the hands free system; and
an adaptor programmed to adapt the signal processor based on the determined deviation; where the adapter is programmed to perform at least one of:
adapting an automatic amplification controller that interfaces the signal processor or,
adapting a limiter or a noise suppressor that communicates with the signal processor.

17. The calibration device of claim 16 where the test signal comprises an audio signal.

18. The calibration device according to claim 17, where the first telephone is a unitary part of the hands free system.

* * * * *

UNITED STATES PATENT AND TRADEMARK OFFICE
CERTIFICATE OF CORRECTION

PATENT NO. : 8,401,489 B2
APPLICATION NO. : 12/202129
DATED : March 19, 2013
INVENTOR(S) : Gerhard Uwe Schmidt et al.

It is certified that error appears in the above-identified patent and that said Letters Patent is hereby corrected as shown below:

On the Title Page

Item (73) Replace "Harman International Industries, Incorporated, Stamford, CT (US)" with
--Harman Becker Automotive Systems GmbH, Karlsbad (DE)--

Signed and Sealed this
Twenty-seventh Day of August, 2013

Teresa Stanek Rea
*Acting Director of the United States Patent and Trademark Office*